(12) United States Patent
Quan et al.

(10) Patent No.: US 7,800,698 B2
(45) Date of Patent: Sep. 21, 2010

(54) WEIGHT ADJUSTMENT IN COLOR CORRECTION

(75) Inventors: Shuxue Quan, San Diego, CA (US); Chinchuan Andrew Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1182 days.

(21) Appl. No.: 11/414,043

(22) Filed: Apr. 27, 2006

(65) Prior Publication Data

US 2007/0263098 A1   Nov. 15, 2007

(51) Int. Cl.
*H04N 5/44* (2006.01)
(52) U.S. Cl. ...................... 348/659; 348/655
(58) Field of Classification Search ......... 348/649–662, 348/222.1, 223.1
See application file for complete search history.

(56) References Cited

U.S. PATENT DOCUMENTS

| | | | | |
|---|---|---|---|---|
| 5,668,596 | A | * | 9/1997 | Vogel ...................... 348/222.1 |
| 5,805,213 | A | * | 9/1998 | Spaulding et al. ......... 348/222.1 |
| 5,929,906 | A | | 7/1999 | Arai |
| 6,600,833 | B1 | * | 7/2003 | Tan et al. ..................... 382/167 |
| 2003/0098916 | A1 | | 5/2003 | Noguchi |
| 2003/0138141 | A1 | | 7/2003 | Quan |

OTHER PUBLICATIONS

Quan, Shuxue, "Analytical Approach to the Optimal Linear Matrix with Comprehensive Error Metric," SPIE Electronic Imaging Conference, vol. 5292, San Jose, CA, US (2004).
Quan S., "Analytical Approach to the Optimal Linear Matrix with Comprehensive Error Metric", Proceedings SPIE Electronic Imaging Conference, vol. 5292, 204, pp. 243-253. XP002467113, 2004.
International Search Report—PCT/US07/067557—International Search Authority—European Patent Office , Feb. 20, 2008.

* cited by examiner

*Primary Examiner*—M. Lee
(74) *Attorney, Agent, or Firm*—Alexander C. Chen; Timothy F. Loomis; Espartaco Diaz Hidalgo

(57) ABSTRACT

Automatic weight adjustment (AWA) to derive an optimal color correction matrix may address unbalanced color reproduction performance among different illuminations and/or unbalanced color reproduction performance for specific memory colors. AWA may emphasize particular colors and equalize color performance. AWA may be implemented in an automatic process with optional manual operation.

31 Claims, 5 Drawing Sheets

WEIGHT ADJUSTMENT IN COLOR CORRECTION

TECHNICAL FIELD

The present application relates to image processing, and more particularly, to weight adjustment in color correction.

BACKGROUND

Spectral responses of human eyes and spectral responses of camera sensors and/or displays may be different. Thus, colors obtained by a camera may differ from colors perceived by humans. Cameras may use image processing techniques to convert image data to various color formats, and perform various enhancements and modifications to the originally captured image. Color conversion techniques can normalize image data to better represent the original source image before output to various displays. A color conversion matrix can convert a red, green, blue (RGB) color space to a component color space ($YC_bC_r$). However, some techniques may be limited in their flexibility for color conversion. It may be desirable to modify color conversion to compensate for different environments, such as lighting conditions, as well as user preferences.

SUMMARY

One aspect relates to a method of generating a color correction matrix. The method comprises: (a) using initial weights for a plurality of illuminants in a color correction matrix optimization process; (b) determining whether a condition has been reached in the optimization process; (c) if the condition has not been reached, adjusting at least one of the weights, using the adjusted weight(s) in the color correction matrix optimization process, and repeating (b); (d) if the condition has been reached, using the adjusted illuminant weight(s) to generate an optimal color correction matrix with substantially equalized color performance for the plurality of illuminants.

Another aspect relates to a method of generating a color correction matrix. The method comprises: (a) using initial weights for a plurality of color patches in a color correction matrix optimization process; (b) determining whether a condition has been reached in the optimization process; (c) if the condition has not been reached, adjusting at least one of the weights, using the adjusted weight(s) in the color correction matrix optimization process, and repeating (b); (d) if the condition has been reached, using the adjusted color patch weight(s) to generate an optimal color correction matrix with enhanced color fidelity of specific colors.

Another aspect relates to an apparatus configured to optimize a color correction matrix. The unit is configured to: (a) use initial weights for a plurality of illuminants in a color correction matrix optimization process; (b) determine whether a condition has been reached in the optimization process; (c) if the condition has not been reached, adjust at least one of the weights, use the adjusted weight(s) in the color correction matrix optimization process, and repeat (b); and (d) if the condition has been reached, use the adjusted illuminant weight(s) to generate an optimal color correction matrix with substantially equalized color performance for the plurality of illuminants.

Another aspect relates to an apparatus comprising a memory configured to store a set of instructions to: (a) use initial weights for a plurality of illuminants in a color correction matrix optimization process; (b) determine whether a condition has been reached in the optimization process; (c) if the condition has not been reached, adjust at least one of the weights, use the adjusted weight(s) in the color correction matrix optimization process, and repeat (b); and (d) if the condition has been reached, use the adjusted illuminant weight(s) to generate an optimal color correction matrix with substantially equalized color performance for the plurality of illuminants.

Another aspect relates to an apparatus comprising: (a) means for using initial weights for a plurality of illuminants in a color correction matrix optimization process; (b) means for determining whether a condition has been reached in the optimization process; (c) if the condition has not been reached, adjust at least one of the weights, means for using the adjusted weight(s) in the color correction matrix optimization process, and repeating (b); and (d) if the condition has been reached, means for using the adjusted illuminant weight(s) to generate an optimal color correction matrix with substantially equalized color performance for the plurality of illuminants.

Another aspect relates to an apparatus configured to: (a) use initial weights for a plurality of color patches in a color correction matrix optimization process; (b) determine whether a condition has been reached in the optimization process; (c) if the condition has not been reached, adjust at least one of the weights, use the adjusted weight(s) in the color correction matrix optimization process, and repeat (b); and (d) if the condition has been reached, use the adjusted color patch weight(s) to generate an optimal color correction matrix with enhanced color fidelity of specific colors.

An apparatus comprising: (a) means to use initial weights for a plurality of color patches in a color correction matrix optimization process; (b) means to determine whether a condition has been reached in the optimization process; (c) if the condition has not been reached, means to adjust at least one of the weights, means to use the adjusted weight(s) in the color correction matrix optimization process, and means to repeat (b); and (d) if the condition has been reached, means to use the adjusted color patch weight(s) to generate an optimal color correction matrix with enhanced color fidelity of specific colors.

The accompanying drawings and description below set forth further details of one or more embodiments.

DETAILED DESCRIPTION

Device

Figure 1:
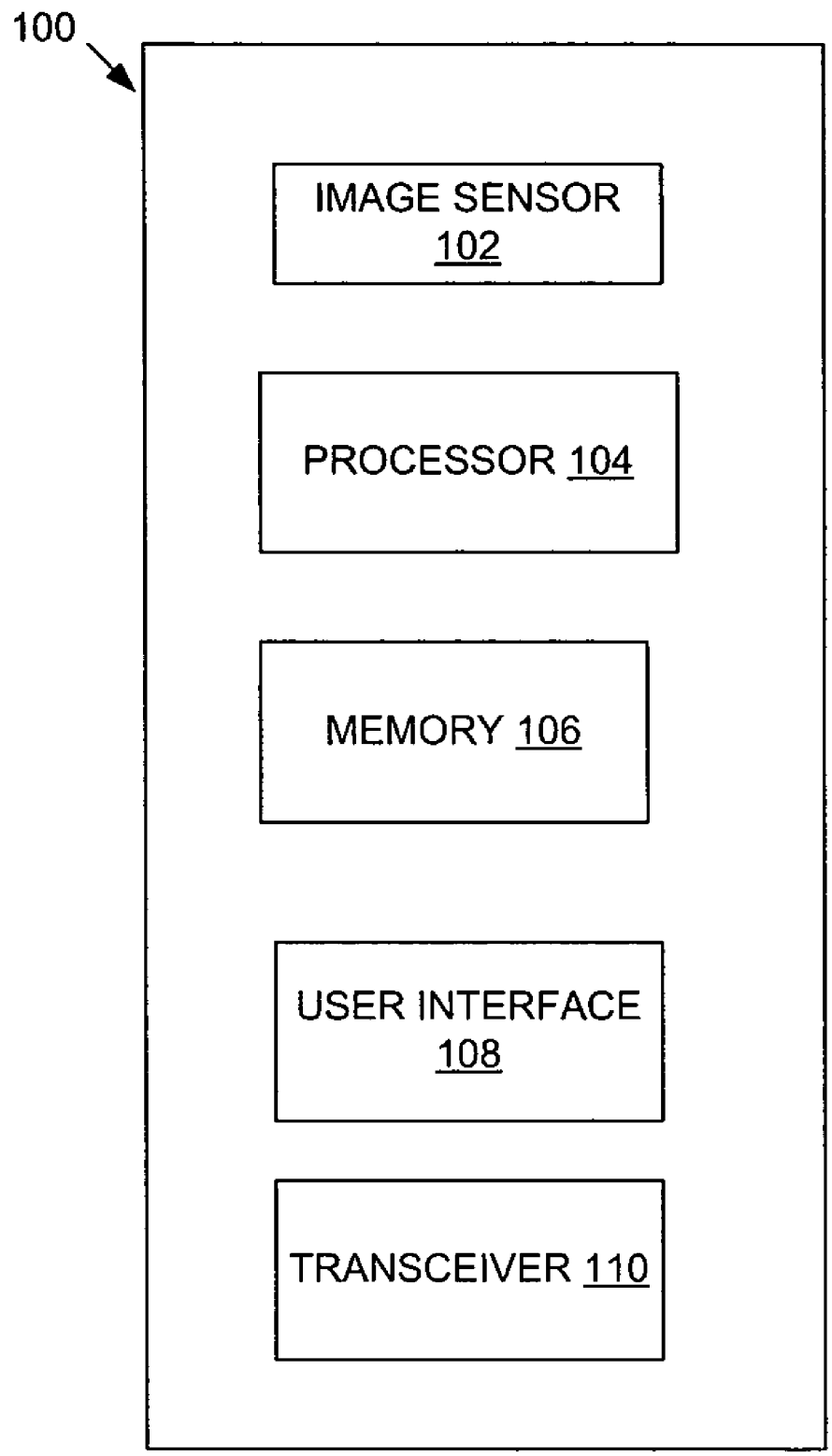
FIG. 1 illustrates a device with an image sensor, a processor, a memory, a user interface, and a transceiver.

FIG. 1 illustrates a device 100 with an image sensor 102, a processor 104, a memory 106, a user interface 108, and a transceiver 110. The user interface 108 may include a display, a keypad, a microphone, an audio speaker and other input or output units. The transceiver may enable wireless communication, such as cellular, satellite, WiFi, or WiMAX communication, etc. The device 100 may include other components in addition to or instead of the components shown in FIG. 1. The device 100 may be a digital camera, a camcorder, a wireless/mobile/cellular/PCS phone, a personal digital assistant (PDA), a lap top computer or some other device.

The processor 104 may include one or more digital signal processors (DSPs), controllers and/or microprocessors. Instead or in addition to the processor 104, the device 100 may include one or more application specific integrated circuits (ASICs) to perform image processing.

The memory 106 may include one or more types of memory (e.g., volatile and/or non-volatile, fixed and/or removable) and one or more components. The memory 106 may be integrated on a microchip with the processor 104. The memory 106 may store raw image data, processed image data, as well as executable instructions for the processor 104 to perform image processing, such as color correction.

A manufacturer of the device 100, a component or software of the device 100 may program the memory 106 with one or more color correction processes, matrices, parameters, etc., as described below.

Color Correction and Color Conversion

A digital camera may improve color accuracy by accounting for a difference between reproduced colors and human perception. A digital camera may employ a "color correction" matrix and a "color conversion" matrix in a color-processing pipeline. A "color correction" matrix is intended to compensate for the difference between the spectral sensitivities of camera sensors and the spectral responses of a human visual system, which is also referred to as "color matching." A color correction matrix may include values to make image data closer to what a human eye would see.

A "color conversion" matrix is intended to convert RGB color space to YCbCr space. A chromatic enhancement matrix is intended to transfer a RGB signal to a YCbCr signal. Adjusting coefficients in this matrix may perform further color tuning for the camera.

In order to obtain the best color reproduction efficiency, coefficients in the two matrices may be optimized according to camera properties (such as sensor sensitivity), image quality requirements and color preference.

The device 100 may use a color correction matrix, such as a 3×3 matrix, in a signal processing pipeline such as:

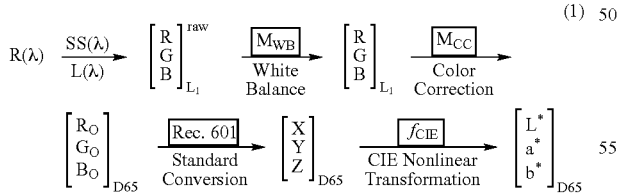

(1)

where $R(\lambda)$ is a surface reflectance of the imaging object/target, $SS(\lambda)$ is a camera's spectral sensitivity, $L_1$ is a spectral power distribution of taking illuminant, and D65 is the daylight illuminant. A diagonal white balance matrix (used to balance relative intensity of three RGB channels) and a standard ITU Rec.601 or Rec.709 matrix may be known. Further details are described in "Analytical Approach to the Optimal Linear Matrix with Comprehensive Error Metric" by Shuxue Quan in Proc. SPIE Electronic Imaging Conference, vol. 5292, San Jose, U.S. (2004), which is incorporated by reference. The order of the processes above may be rearranged in other embodiments.

Optimizing a Color Correction Matrix

An optimal color correction matrix may lead to (a) unbalanced color reproduction performance among different testing color patches, i.e., memory colors, and/or (b) unbalanced color reproduction performance among different illuminant types, i.e., illuminations (e.g., daylight (denoted as D65), tungsten (denoted as A), and fluorescent illuminant TL84 (denoted as F)). Equalizing color performance among these different illuminants may be important because users may object to a camera that works much worse under one type of illuminant compared to other types.

In some special capture modes or scenarios, a user may desire color reproduction for one specific color region to have higher accuracy than other color regions. For example, in a portrait mode, a user may desire skin colors to be captured more accurately than other colors. In a landscaping mode, a user may prefer the green, sky blue colors and white have more accuracy.

The description below provides a unified approach to address (a) unbalanced color reproduction performance among different illuminations (illuminant types) and/or (b) unbalanced color reproduction performance for specific memory colors (testing color patches). This may be achieved through a process called automatic weighting adjustment (AWA). AWA may emphasize particular colors and equalize color performance. AWA may be implemented in an automatic process with optional manual operation.

A color correction matrix may be optimized by minimizing a total error metric (TEM), which may be defined as a linear combination of (a) color difference (average shift from a reference signal) and (b) noise metric (NM) with default equal weights $w_c$ and $w_n$ or weights from psychophysical studies:

$$TEM = w_c \cdot \text{ColorMetric} + w_n \cdot \text{NoiseMetric} \qquad (2)$$

The color metric (CM) is defined as the average color difference, and the noise metric (NM) is defined as visual noise among color patches in a testing set of 24 samples (e.g., Macbeth ColorChecker or other testing chart) as follows:

$$CM = \sqrt[n]{\frac{1}{24}\sum_{i=1}^{24} wDE_i \cdot \Delta E_i^n}, \qquad (3)$$

$$\sum_{i=1}^{24} wDE_i = 1$$

$$NM = \sqrt[n]{\frac{1}{24}\sum_{i=1}^{24} wN_i \cdot N_i^n} \qquad (4)$$

$$\frac{1}{24}\sum_{i=1}^{24} wN_i = 1$$

where $wDE_i$ is a weight for color difference, $\Delta E_i$ is the color difference between the captured and reference in value for color patch i (DE and $\Delta E$ are the same), $wN_i$ is a weight for visual noise, and $N_i$ is a visual noise value for color patch i. The above equations assume 24 color patches in the Macbeth ColorChecker are used as the test target. Other sets of color patches may be used. The power number is equal to one by default, but other power numbers may be selected. The weights for the 24 color patches are equal by default, but they can be changed to emphasize specific color patches. Further details are described in "Analytical Approach to the Optimal Linear Matrix with Comprehensive Error Metric" by Shuxue Quan in Proc. SPIE Electronic Imaging Conference, vol. 5292, San Jose, U.S. (2004).

As the color correction matrix is optimized for several illuminants, a combined error matrix may be defined for three illuminants considered: daylight (denoted as D65), tungsten (denoted as A), and fluorescent illuminant TL84 (denoted as F). The illuminants may vary and may be more or less depending on different applications. A combined total error metric (CTEM) (or cost function) may be expressed as:

$$\text{CTEM} = wD65 * \text{TEM}_{D65} + wA * \text{TEM}_A + wF * \text{TEM}_F \quad (5)$$

The default illuminant weights wD65, wA and wF may be equal to each other (equal to ⅓) but can vary for different applications. The illuminant weights wD65, wA and wF in Equation (5) and the color patch weights wDE and wN in Equations (3) and (4) may be adjusted to (a) equalize color reproduction performance or (b) emphasize color accuracy of specific colors.

Figure 2:
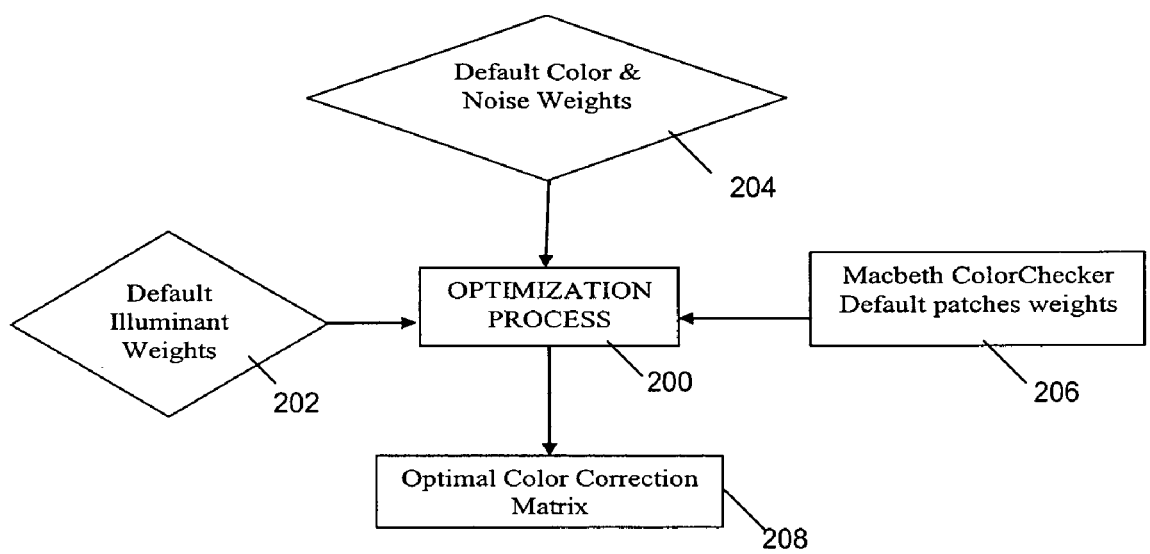
FIG. 2 illustrates a structure and process for optimizing a color correction matrix, which may be used by the device of FIG. 1.

FIG. 2 illustrates a structure and process for optimizing a color correction matrix, which may be used by the device 100 in FIG. 1. In general, optimization of a color correction matrix is conducted to minimize a cost function, such as Equation (5). As shown in FIG. 2, default illuminant weights 202, default color and noise weights 204, and default color patch weights (e.g., Macbeth ColorChecker) 206 are processed by an optimization process or module 200 to provide an optimal color correction matrix 208. The default color patch weights 206 may all be equal and sum to 1.

Figure 3:
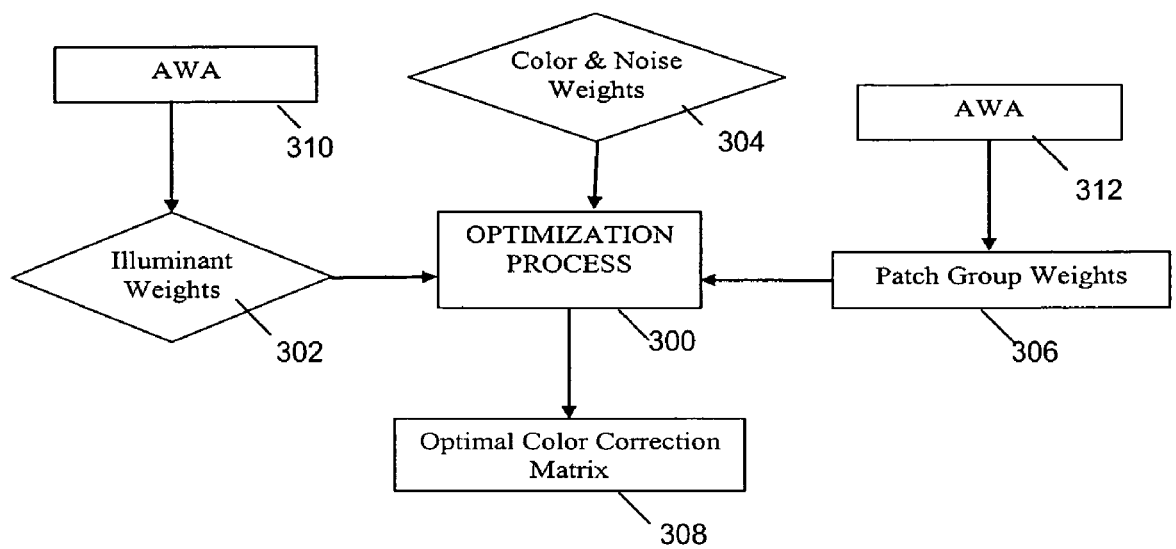
FIG. 3 illustrates a variation of FIG. 2 with automatic weighting adjustment (AWA) applied to (a) equalize color performance among multiple illuminants and/or (b) enhance color fidelity of specific colors.

FIG. 3 illustrates a variation of FIG. 2 with automatic weighting adjustment (AWA) 310, 312 applied to (a) equalize color performance among multiple illuminants with weights 302 (i.e., color performance equivalence) and/or (b) enhance color fidelity of specific colors with patch weights 306 (i.e., color fidelity preference), which are represented by corresponding color patches in a testing chart. The AWA may equalize color difference, as described below.

Adjusting Illuminant Weights

Figure 4:
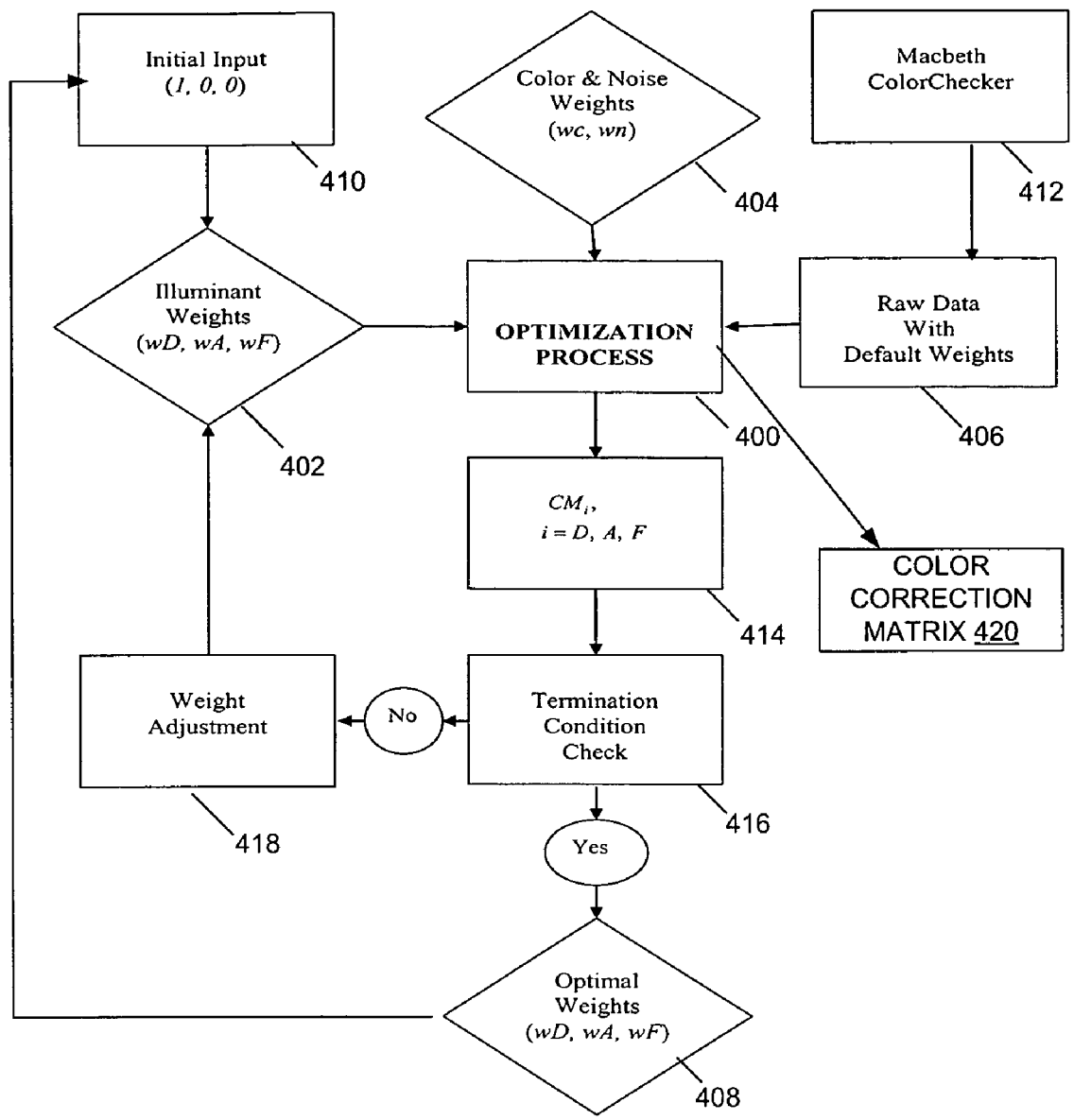
FIG. 4 illustrates a detailed example of FIG. 3 to adjust illuminant weights for equalizing color reproduction performance.

FIG. 4 illustrates a detailed example of FIG. 3 to adjust illuminant weights wD, wA and wF for equalizing color reproduction performance.

An initial input 410 may be used for the illuminant weights 402. After a first optimization process 400, the AWA of illuminant weights 402 may iterate through blocks 414-418 (the three illuminant weights are adjusted simultaneously and accordingly). Block 416 determines whether an ending/termination condition has been reached. The termination condition may be the average color differences ΔE are relatively close to each other for the three illuminants D, A and F. Adjusting at each step 418 is modulated by (i.e., set according to) the color difference values ΔE for the three illuminants D, A and F. Illuminant weights wD, wA and wF may be expressed as:

$$wD^{n+1} = wD^n - \frac{\Delta E_A - \Delta E_D}{\Delta E_D} \times \alpha - \frac{\Delta E_F - \Delta E_D}{\Delta E_D} \times \beta, \quad (6)$$

$$wA^{n+1} = wA^n + \frac{\Delta E_A - \Delta E_D}{\Delta E_D} \times \alpha,$$

$$wF^{n+1} = wF^n + \frac{\Delta E_F - \Delta E_D}{\Delta E_D} \times \beta.$$

The adjusting step size ($\alpha$, $\beta$) in Equation (6) may be changed according to different applications. In one example, the adjusting step size ($\alpha$, $\beta$) may be 0.01, but other values may be used. After ten steps (iterations), the average color differences ΔE for the three illuminants may be very close. For example, final illuminant weights may be: wD=0.373010, wA=0.270244, and wF=0.356746. The optimal average DE values for illuminants D65, A, and F may be:

| $\overline{\Delta E^*_{ab}}$ | D | A | F |
|---|---|---|---|
| | 5.848570 | 5.896752 | 6.459236 |

The final optimal weights wD, wA and wF 408 are used as the illuminant weights 402 by the optimization process 400 to derive an optimal color correction matrix 420.

Adjusting Color Patch Weights

Figure 5:
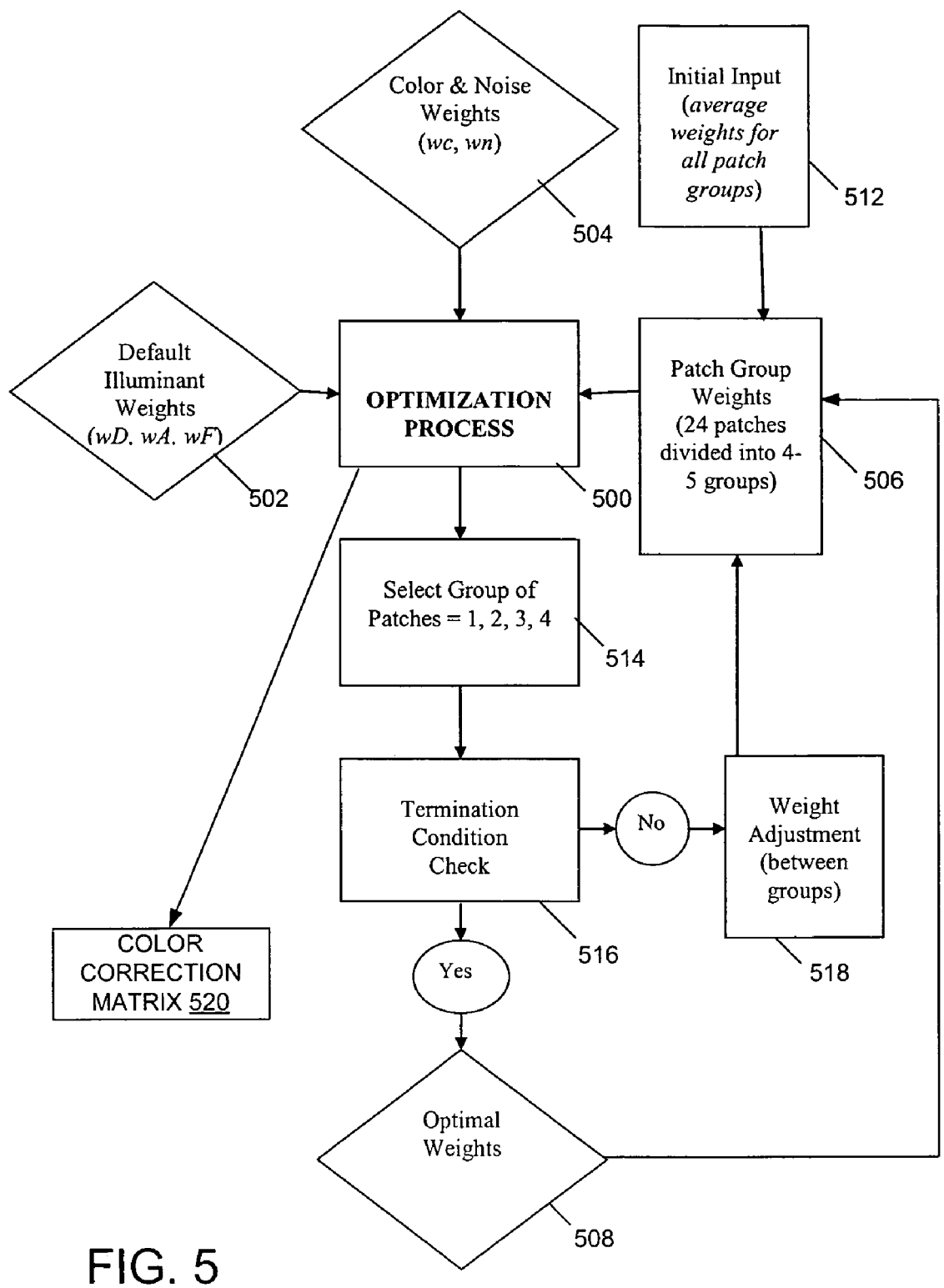
FIG. 5 illustrates a detailed example of FIG. 3 to adjust patch weights for emphasizing color accuracy of specific colors.

FIG. 5 illustrates a detailed example of FIG. 3 to adjust color patch weights for emphasizing color accuracy of specific colors. Color fidelity preference in FIG. 5 may be achieved in a similar way as equalizing color reproduction performance in FIG. 4. In one configuration, if twenty-four color patch weights are too many, the 24 color patches may be categorized into 4 or 5 groups, such as memory colors, grey patches, skin colors, purples, greens, etc., where each group may have the same weighting assigned. The weight may change linearly in the Log domain. The weight may show some difference for the patches of interest. On the user interface 108, the user may have one or more slide bars with two ends such as "normal" and "high fidelity" (or something similar).

In FIG. 5, the optimization process 500 may use default illuminant weights 502 and an initial input 512 (average weights for all patch groups) as the color patch weights 506. The optimization process 500 iterates in blocks 514-518 by adjusting one or more weights between groups of patches. Block 514 selects a group of patches one group at a time. Block 516 checks for a termination condition. Block 518 adjusts one or more patch weights between groups of patches. Optimal patch weights 508 are used by the optimization process 500 to derive an optimal color correction matrix 520.

When the weights for specific patches increase, the color difference reduces gradually. However, a weight may increase the color differences for the other patches. For some applications, if only specific colors demand more accuracy, it is useful to perform such weights adjustment.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method in an electronic device of generating a color correction matrix, the method comprising:
    (a) using initial weights for a plurality of illuminants in a color correction matrix optimization process;
    (b) determining whether a condition has been reached in the optimization process;
    (c) adjusting at least one of the initial weights to provide at least one adjusted weight and using the adjusted weights in the color correction matrix optimization process, if the condition has not been reached;
    (d) repeating (b) and (c) until the condition is reached; and
    (e) using the adjusted weights to generate an optimal color correction matrix with substantially equalized color performance for the plurality of illuminants, if the condition has been reached;
    wherein the method is implemented in the electronic device.

2. The method of claim 1, wherein the condition comprises average color differences ΔE that are relatively close to each other for the illuminants.

3. The method of claim 1, wherein the illuminants include daylight (D65), tungsten (A), and fluorescent illuminant TL84 (F).

4. The method of claim 1, further comprising using color difference and noise metric weights in the color correction matrix optimization process.

5. The method of claim 1, further comprising using color patch weights in the color correction matrix optimization process.

6. The method of claim 1, wherein the color correction matrix optimization process comprises minimizing a total error metric (TEM), which is a linear combination of a color difference and a noise metric (NM), wherein the color difference is an average shift from a reference signal.

7. The method of claim 1, wherein the color correction matrix optimization process comprises minimizing a combined total error metric (CTEM), which is a linear combination of color differences and noise metrics for a plurality of illuminants.

8. A method in an electronic device of generating a color correction matrix, the method comprising:
    (a) using initial weights for a plurality of color patches in a color correction matrix optimization process;
    (b) determining whether a condition has been reached in the optimization process;
    (c) if the condition has not been reached, adjusting at least one of the weights, using the adjusted weight(s) in the color correction matrix optimization process, and repeating (b); and
    (d) if the condition has been reached, using the adjusted color patch weight(s) to generate an optimal color correction matrix with enhanced color fidelity of specific colors;
    wherein the color patches are organized into groups, and each group has a corresponding weight, and
    wherein the method is implemented in an electronic device.

9. The method of claim 8, wherein some color patches are organized into a group of skin colors.

10. An apparatus comprising:
    an electronic device configured to:
    (a) use initial weights for a plurality of illuminants in a color correction matrix optimization process;
    (b) determine whether a condition has been reached in the optimization process;
    (c) adjust at least one of the initial weights to provide at least one adjusted weight and use the adjusted weights in the color correction matrix optimization process, if the condition has not been reached;
    (d) repeat (b) and (c) until the condition is reached; and
    (e) use the adjusted weights to generate an optimal color correction matrix with substantially equalized color performance for the plurality of illuminants, if the condition has been reached.

11. The apparatus of claim 10, wherein the condition comprises average color differences ΔE that are relatively close to each other for the illuminants.

12. The apparatus of claim 10, wherein the illuminants include daylight (D65), tungsten (A), and fluorescent illuminant TL84 (F).

13. The apparatus of claim 10, wherein the unit is further configured to use color difference and noise metric weights in the color correction matrix optimization process.

14. The apparatus of claim 10, wherein the unit is further configured to use color patch weights in the color correction matrix optimization process.

15. The apparatus of claim 10, wherein the color correction matrix optimization process comprises minimizing a total error metric (TEM), which is a linear combination of a color difference and a noise metric (NM), wherein the color difference is an average shift from a reference signal.

16. The apparatus of claim 10, wherein the color correction matrix optimization process comprises minimizing a combined total error metric (CTEM), which is a linear combination of color differences and noise metrics for a plurality of illuminants.

17. A computer-readable medium comprising instructions that when executed perform a method of:

initializing weights for a plurality of illuminants in a color correction matrix optimization process;

determining whether a condition has been reached in the optimization process;

adjusting at least one of the weights; and generating, using the weights, an optimal color correction matrix with substantially equalized color performance for the plurality of illuminants, if the condition has been reached.

18. The computer-readable medium of claim 17, wherein the condition comprises average color differences (ΔE) that are relatively close to each other for the illuminants.

19. The computer-readable medium of claim 17, further comprising using color difference and noise metric weights in the color correction matrix optimization process.

20. The computer-readable medium of claim 17, wherein the computer readable medium comprises a hard disk or a CD-ROM.

21. An apparatus comprising:

means for initializing weights for a plurality of illuminants in a color correction matrix optimization process;

means for determining whether a condition has been reached in the color correction matrix optimization process;

means for adjusting at least one of the weights, if the condition has not been reached; and means for generating, using the weights, an optimal color correction matrix with substantially equalized color performance for the plurality of illuminants.

22. The method of claim 21, wherein the illuminants include daylight (D65), tungsten (A), and fluorescent illuminants TL84 (F).

23. The method of claim 21, further comprising means for using color difference and noise metric weights in the color correction matrix optimization process.

24. The method of claim 21, further comprising means for using color patch weights in the color correction matrix optimization process.

25. An electronic device configured to:

initialize weights for a plurality of illuminants in a color correction matrix optimization process;

determine whether a condition has been reached in the optimization process;

adjust at least one of the weights; and generate, using the weights, an optimal color correction matrix with substantially equalized color performance for the plurality of illuminants, if the condition has been reached.

26. The electronic device of claim 25, wherein the color correction matrix optimization process comprises minimizing a total error metric (TEM), which is a linear combination of a color difference and a noise metric (NM), wherein the color difference is an average shift from a reference signal.

27. The electronic device of claim 25, wherein generating the optimal color correction matrix includes using color difference weights and noise metric weights in the color correction matrix optimization process.

28. The electronic device of claim 25, wherein the electronic device is further configured to use color patch weights in the color correction matrix optimization process.

29. An apparatus comprising:

means for initializing weights for a plurality of color patches in a color correction matrix optimization process;

means for organizing color patches into groups, wherein each group has a corresponding group weight;

means for determining whether a condition has been reached in the color correction matrix optimization process;

means for adjusting at least one of the weights, if the condition has not been reached; and means for generating, using the weights, an optimal color correction matrix with enhanced color fidelity of specific colors, if the condition has been reached.

30. The apparatus of claim 29, wherein the color patches are organized into a group of skin colors.

31. The apparatus of claim 29, wherein the apparatus comprises a camera.

* * * * *